United States Patent Office 2,892,849
Patented June 30, 1959

2,892,849

PROCESS FOR PREPARING EPOXYALKYL ARYL ETHERS

William Edward St. Clair, Pittsburgh, Pa., assignor to Koppers Company, Inc., a corporation of Delaware No Drawing. Application November 10, 1955
Serial No. 546,255

8 Claims. (Cl. 260—348.6)

This application is concerned with a new and improved method of preparing epoxyalkyl aryl ethers and is particularly concerned with the preparation of substantially completely etherified glycidyl aryl ethers containing a maximum oxirane oxygen content.

Heretofore epoxyalkyl aryl ethers have been prepared by reacting compounds containing hydroxyl groups bonded directly to an aromatic nucleus with a haloepoxyalkane in the presence of a strong alkali. Various procedures have been proposed, such as for example, that in which an aromatic compound containing a ring-substituted hydroxyl group is dissolved in aqueous alkali to produce the corresponding alkali metal salt, adding the haloepoxyalkane to this solution and heating to yield the desired ether. An alternative method suggested is a similar reaction under substantially anhydrous conditions. Neither of these processes produces epoxyalkyl aryl ethers having significantly high oxirane oxygen contents.

It is an object of this invention to make available an improved process of preparing epoxyalkyl aryl ethers having higher oxirane oxygen contents and in greater yield than heretofore obtainable with the aforementioned methods.

It is a further object of this invention to prepare epoxy glycidyl aryl ethers having maximum oxirane oxygen content by the complete or substantially complete etherification of the aforedescribed hydroxyl containing aromatic compounds.

It has now been discovered, as a feature of this invention, that it is readily possible to produce epoxyalkyl aryl ethers having the theoretical maximum oxirane oxygen content by the substantially complete etherification of an aromatic compound containing one or more ring-substituted hydroxyl groups. In particular the present invention has application to the etherification of the hydroxyl groups bonded directly to the nucleus of monomeric aromatic compounds.

The present process embraces a process of preparing epoxyalkyl aryl ethers in which substantially all of the starting hydroxyl groups are etherified by the technique of dissolving a compound containing a ring-substituted hydroxyl group in a quantity of a haloepoxyalkane in excess of that required for complete etherification of said compound, heating the solution to a temperature below the decomposition temperature of the chloroepoxyalkane, adding gradually to this solution an alkali hydroxide dissolved in a lower alcohol and recovering the desired epoxyalkyl aryl ether thereby produced. "Lower alcohol" as used herein is intended to define aliphatic alcohols having less than five carbon atoms, particularly those in which the alkali hydroxides are easily soluble.

Among the aromatic compounds containing ring-substituted hydroxyl groups suitable in the process of this invention, it is preferred to utilize mononuclear dihydroxy compounds such as resorcinol, catechol and hydroquinone. The invention finds particular utility with the more strongly acidic hydroxyl compounds. Illustrative, but not limitative of the compounds which are within the scope of the present invention, are for example, phenol, the cresols, the xylenols, mesitol, durenol, thymol, pentamethylphenol, catechol, resorcinol, quinol, orcinol, dihydroxyxylol, mesorcinol, thymoquinol, pyrogallol, pentahydroxybenzene, hexahydroxybenzene, naphthol, anthrol, bisphenol and the like.

The present invention finds particular applicability in the preparation of glycidyl ethers. While epichlorohydrin (1-chloro-2,3-epoxypropane) is a preferred haloepoxyalkane, in accordance with this invention there can be utilized any haloepoxyalkane having a halogen atom which will react at a temperature below the decomposition temperature of its oxirane ring. Illustrative, but not limitative of suitable haloepoxyalkane are, for example 1-chloro-2,3-epoxybutane
1-chloro-3,4-epoxybutane
2-chloro-3,4-epoxybutane
1-chloro-2-methyl-2,3-epoxypropane
1-bromo-2,3-epoxypentane
2-chloromethyl-1,2-epoxybutane
1-bromo-4-methyl-3,4-epoxypentane
1-bromo-4-ethyl-2,3-epoxypentane
4-chloro-2-methyl-2,3-epoxypentane
1-chloro-2,3-epoxyoctane
1-chloro-2-methyl-2,3-epoxydecane
1-chloro-2-methyl-epoxymethane, etc.

In a more specific aspect, a ring-substituted hydroxyl containing aromatic compound of the foregoing description is dissolved in a quantity of a haloepoxyalkane in excess of that required for complete etherification of the starting hydroxyl groups. This excess may be slight and while it can be used in any desired amount little advantage is gained by utilizing an amount of the halogenated compound in excess of 12 mols per hydroxyl group. More specifically it is preferred to use quantities in the range of from about 2.5 to 5.0 mols per aromatic hydroxyl group.

The solution is then heated to a temperature of at least about 60° C. but below the decomposition temperature of the haloepoxyalkane prior to the addition of the alcoholic alkali hydroxy solution. This is an important aspect of this invention since any deviation from this step does not produce the desired high yields of etherified products having a high oxirane oxygen content.

The alkali hydroxides which are eminently suitable in the process of this invention are those of group I of the periodic system, specifically lithium, sodium, potassium, rubidium and cesium. Specifically, an alkali hydroxide of this group is dissolved in a lower alcohol and this alcoholic solution is added gradually, and preferably dropwise to the aforedescribed heated solution of hydroxy aromatic compound in the haloepoxyalkane. The quantity of hydroxide employed is such that there is a molecular amount equivalent to the number of hydroxyl groups present to be etherified.

The oxirane oxygen content as described herein is determined by dissolving 1 gram of the etherified reaction product in 25 milliliters of one-third normal pyridine hydrochloride and refluxing the solution for 1 hour. Thereafter the solution is transferred to another vessel with approximately 50 mls. of pyridine. Excess pyridine hydrochloride is titrated potentiometrically with 0.33 N alcoholic potassium hydroxide. Within 0.10 ml. of the endpoint the addition of 0.10 ml. of titrant causes a change of 1 pH unit.

The improvement realized in oxirane oxygen content by following the process of this invention is highly significant and will be illustrated more clearly in the examples wherein products were obtained containing substantially higher oxirane oxygen contents than obtainable with known methods.

The following examples are given by way of illustration and not by way of limitation. All parts and percentages are by weight unless otherwise specified.

*Example I*

Employing the conditions of this invention, 220 parts of resorcinol were dissolved in 1480 parts of epichlorohydrin and this solution heated to 98° C. Addition of an alcoholic solution of potassium hydroxide composed of 160 parts of potassium hydroxide in 1200 parts of 95% ethanol was started dropwise. At the end of 5 minutes the reaction temperature dropped to less than 90° C. Addition of the alcoholic potassium hydroxide was accompanied by removal of alcohol at the same rate in order to maintain a constant volume. The entire solution of alcoholic potassium hydroxide was added in 1 hour and the reaction mixture refluxed for 2 hours. The reaction mixture was filtered while hot to remove sodium chloride and the filtrate vacuum distilled. From the residue was recovered a glycidyl ether of resorcinol in a yield of 393 parts corresponding to 88.5% of theory based on resorcinol. This product analyzed 14.2% oxirane oxygen compared to the theoretical oxirane oxygen content of 14.4%.

*Example II*

Example I was repeated with sodium hydroxide to give a product having similar oxirane oxygen content.

*Example III*

Example II was repeated with sodium hydroxide and methanol to give a similar etherified product, employing a reflux temperature of approximately 63–65° C.

*Example IV*

In a manner similar to that employed for etherification of the resorcinol monomer of Example I, 94.1 parts of phenol were dissolved in 1440 parts of epichlorohydrin. To this solution at reflux were added dropwise 65 parts of potassium hydroxide in 600 parts of ethyl alcohol. 135 parts of product corresponding to 93% of theory were recovered. The product analyzed 9.1% oxirane oxygen as compared to a theoretical oxirane oxygen content of 9.3%.

*Example V*

Example IV is repeated with sodium hydroxide to give a product analyzing an equivalent oxirane oxygen content.

*Example VI*

Following the procedure of Example IV, 330 parts of hydroquinone were dissolved in 220 parts of epichlorohydrin and the solution heated to reflux. To this solution maintained at reflux were added dropwise 396 parts of potassium hydroxide in 1200 parts of 95% ethanol. A product analyzing 13.9% oxirane oxygen was recovered. This corresponds to a theoretical oxirane oxygen content of 14.4%.

*Example VII*

Example VI is repeated with sodium hydroxide to give a similar product.

From the foregoing examples it is clear that a substantial improvement in the method of producing epoxyalkyl aryl ethers is herein presented. The magnitude of improvement in each instance is clear and completely unexpected. While certain illustrative examples are given it is obvious that other ring-substituted hydroxyl aromatic compounds are within the scope of this invention and can be substituted with ease to produce substantially completely etherified products.

While the invention has been described with particular embodiments thereof it will be understood that in its broadest aspects the invention may be variously embodied within the scope of the invention as set forth herein and in the appended claims.

What is claimed as new is:

1. In a method of making vicinal epoxyalkylaryl ethers wherein a phenol is contacted with a vicinal haloepoxyalkane in the presence of an alkali metal hydroxide, the improvement comprising dissolving said phenol in a quantity of said vicinal haloepoxalkane in excess of that required for etherification, heating the resulting solution to a temperature of at least about 60° C. and below the decomposition temperature of said haloepoxyalkane, and adding gradually thereto an alkali metal hydroxide dissolved in an alkanol having less than 5 carbon atoms, whereby substantially complete etherification of said phenol is obtained.

2. Method of claim 1 wherein said phenol is resorcinol.
3. Method of claim 1 wherein said phenol is phenol.
4. Method of claim 1 wherein said phenol is cresol.
5. Method of claim 1 wherein said alkali metal hydroxide is sodium hydroxide.
6. Method of claim 1 wherein said alkali metal hydroxide is potassium hydroxide.
7. Method of claim 1 wherein said alkanol is methanol.
8. Method of claim 1 wherein said alkanol is ethanol.

References Cited in the file of this patent

UNITED STATES PATENTS

| | | |
|---|---|---|
| 2,467,171 | Werner | Apr. 12, 1949 |
| 2,506,486 | Bender | May 2, 1950 |
| 2,564,194 | Nie | Aug. 14, 1951 |
| 2,659,710 | Martin | Nov. 17, 1953 |
| 2,735,829 | Wiles | Feb. 21, 1956 |
| 2,758,119 | Bell | Aug. 7, 1956 |